United States Patent
Sliva

(10) Patent No.: US 7,319,871 B2
(45) Date of Patent: Jan. 15, 2008

(54) METHOD AND APPARATUS FOR REPEATABLE HANDBACK ATTEMPT AFTER INTER-MSC HANDOFF

(75) Inventor: Vladimir P. Sliva, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 732 days.

(21) Appl. No.: 10/795,763

(22) Filed: Mar. 8, 2004

(65) Prior Publication Data

US 2005/0197122 A1    Sep. 8, 2005

(51) Int. Cl.
*H04Q 7/20* (2006.01)

(52) U.S. Cl. .................. 455/436; 455/437; 455/445

(58) Field of Classification Search ........ 455/436–444, 455/445, 442
See application file for complete search history.

(56) References Cited

U.S. PATENT DOCUMENTS

| | | | |
|---|---|---|---|
| 5,857,153 | A | 1/1999 | Lupien |
| 6,256,501 | B1 | 7/2001 | Tokuyama et al. |
| 6,519,455 | B1 | 2/2003 | McCormick et al. |
| 2002/0009997 | A1* | 1/2002 | Stuempert et al. ........... 455/439 |
| 2002/0072371 | A1* | 6/2002 | Hokkanen .................. 455/438 |
| 2004/0146021 | A1* | 7/2004 | Fors et al. .................. 370/331 |

FOREIGN PATENT DOCUMENTS

WO    WO 01/30107 A2    4/2001

OTHER PUBLICATIONS

TIA/EIA Interim Standard, G3G CDMA-DS to ANSI/TIA/EIA-41, TIA/EIA/IS-834, Telecommunications Industry Association, Mar. 2000.

Yu, J. I., "IS-41 For Mobility Management", International Conference on Universal Personal Communications, IEEE, New York, NY, US, Sep. 29, 1992, pp. 158-162, XP000494916.

* cited by examiner

*Primary Examiner*—Melur Ramakrishnaiah

(57) ABSTRACT

A method and apparatus providing a handback process in a wireless telecommunication system after an inter-MSC handoff from a first MSC to a second MSC during an active call to an MS are provided. In one embodiment, the method includes: a) initiating an inter-MSC handback attempt from the second MSC to the first MSC, b) setting up resources in the first MSC and a first BS associated with the first MSC, c) sending a command to the MS directing the MS to begin the inter-MSC handback attempt, d) receiving a message from the MS indicating that the inter-MSC handback attempt failed, e) timely cleaning up the resources set up in the first MSC and first BS due to the new message exchange between the first and second MSCs, and f) sending a message to a second BS associated with the second MSC indicating that the first MSC and first BS are ready for another inter-MSC handback attempt.

20 Claims, 4 Drawing Sheets

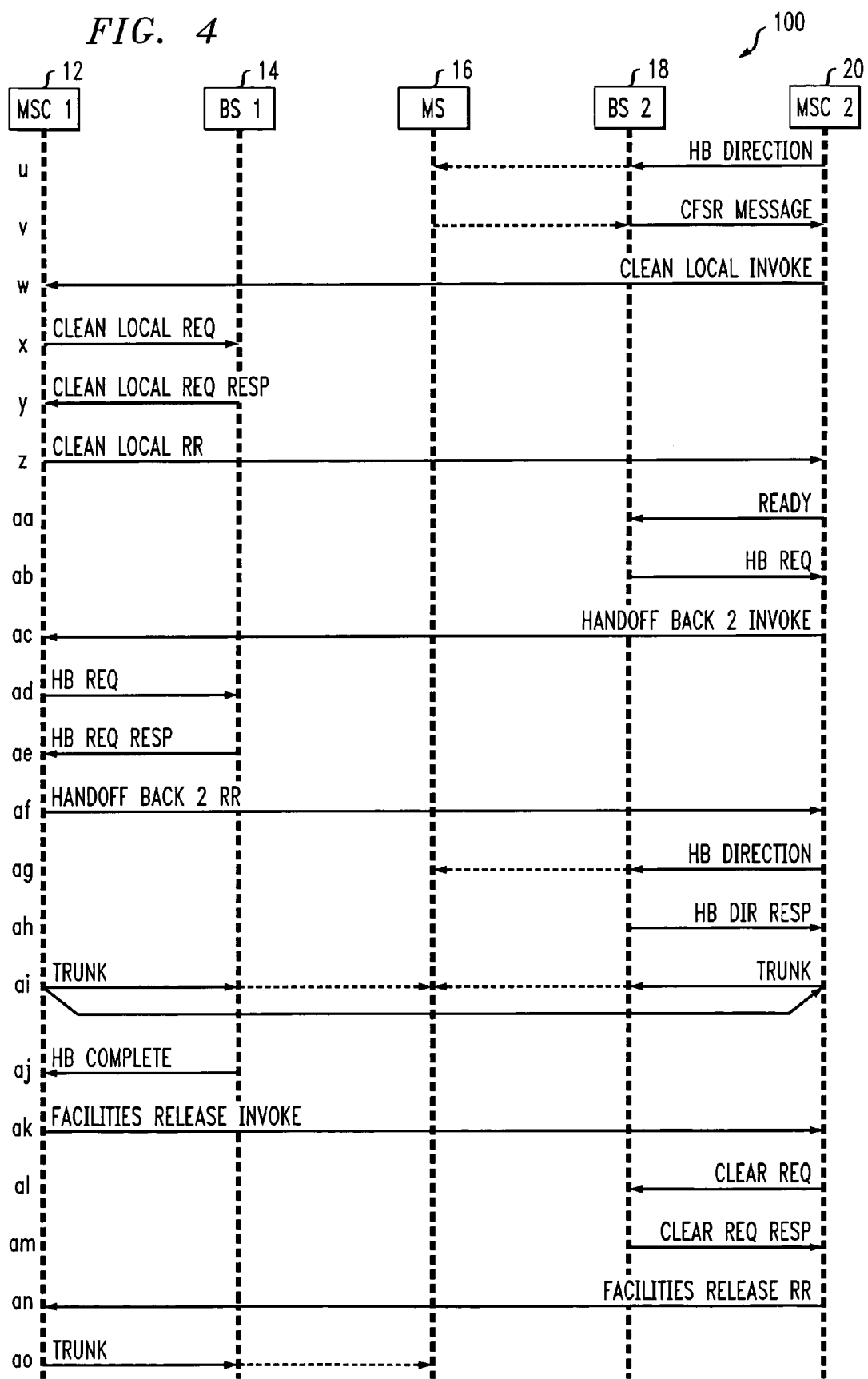

METHOD AND APPARATUS FOR REPEATABLE HANDBACK ATTEMPT AFTER INTER-MSC HANDOFF

BACKGROUND OF THE INVENTION

The invention relates to a method and apparatus for a repeatable handback attempt after an inter-mobile switching station (MSC) handoff during an active call. If a preceding handback was not successful, the method and apparatus prepares for another handback attempt and, if a handback is called for, attempts to handback the call again.

While the invention is particularly directed to the art of handback attempts after an inter-MSC handoff, and will be described with specific reference thereto, it will be appreciated that the invention may have usefulness in other fields and applications. For example, the invention may be used in conjunction with any type of handoff involving subsequent teardown of a trunk between a target and source after completion of the handoff.

By way of background, handoff and handover are synonyms referring to an operation in wireless technology that transfers communication with a mobile station (MS) from a first base station (BS) to another BS which may be in a different MSC. After the inter-MSC handoff, circumstances may occur that cause communications with the MS to be transferred back to the first MSC. This is referred to as a handback or a handoff back because it follows the previous handoff. Thus, as used herein, handoff and handover have the same meaning and may be used interchangeably. Likewise, handback and handoff back have the same meaning and may be used interchangeably. Moreover, since a handback is a certain type of handoff that follows a previous handoff, a handback may also be referred to as a handoff or handover.

Inter-vendor handoffs (i.e., hard handoffs) use ANSI-41 messages between the MSCs of two different vendors. A vendor may also use ANSI-41 messages for handoffs between its own MSCs (i.e., intra-vendor handoffs). Subsequent to a given handoff, for example from MSC A to MSC B, the mobile user may travel back to the area of MSC A. This creates a situation where a handback attempt is requested where MSC A (the source for the previous handoff) is now a target for the handback attempt. After a successful handback, the resources on the MSC B (the source for the handback attempt) are cleaned up. If a handoff or handback attempt fails, the MS returns a candidate frequency search report message to the source cell (i.e., BS). Upon receiving the candidate frequency search report message instead of a handoff complete message, the source BS communicates an abort message to the source MSC. This instructs the source MSC to abort the failed handoff or handback attempt. However, currently, there is no means of communicating failure of the handback attempt from the source MSC to the target MSC at that stage. Thus, there is no means for the source MSC to instruct the target MSC to abort the handback attempt. The handback attempt is only aborted by the target MSC after timers associated with the handback attempt on the target side expire before the handback attempt is completed.

It is important to note that (handoff and) handback attempts occur when the signal between the source cell and the MS is weak. Thus, it is desirable that the next (handoff or) handback attempt can follow soon after a failed attempt, otherwise the call could drop. On the other hand, it is not desirable to attempt the next (handoff or) handback before the allocated resources on the target side from the previous failed attempt are cleaned up or are about to be cleaned up. Since it is likely that there will be many simultaneous (handoff or) handback attempts by many MSs in that area, any strategy that attempts the next (handoff or) handback prior to clean up would potentially tangle the resources on the target side.

One problem associated with the forgoing scenario is that there is currently no ANSI-41 message for the source MSC to communicate to the target MSC that tells the target MSC to abort the handback attempt because the MS failed to re-tune to the target cell (i.e., BS) in the other MSC. Another problem is that the existing ANSI-41 FacilitiesRelease message cannot be used for this purpose as it contains the mandatory InterMSCCircuitID parameter which implies that an inter-vendor trunk between the source and target MSCs would be released by the recipient (target) MSC. However, in the case of a return from failed handback we want to keep this trunk and only release resources on the target MSC.

The present invention contemplates a new and improved handback process in a wireless telecommunication system after an inter-MSC handoff during an active call to an MS that resolves the above-referenced difficulties and others.

SUMMARY OF THE INVENTION

A method and apparatus providing a handback process in a wireless telecommunication system after an inter-MSC handoff from a first MSC to a second MSC during an active call to an MS are provided.

In one aspect of the invention, a method for providing a handback process in a wireless telecommunication system after an inter-MSC handoff from a first MSC to a second MSC during an active call to an MS is provided. The call is routed from the first MSC to the second MSC via an inter-MSC trunk as a result of the inter-MSC handoff. In one embodiment, the method includes: a) initiating an inter-MSC handback attempt from the second MSC to the first MSC in response to the MS moving into a geographic area associated with the first MSC, b) setting up resources in the first MSC and a first BS associated with the first MSC for routing the call to the MS, c) sending a command to the MS directing the MS to begin the inter-MSC handback attempt by attempting to communicate with the first BS, d) receiving a message from the MS indicating that the inter-MSC handback attempt to the first BS failed, e) cleaning up the resources set up in the first MSC and first BS for routing the call to the MS, and f) sending a message to a second BS associated with the second MSC indicating that the first MSC and first BS are ready for another inter-MSC handback attempt.

In another embodiment, the method includes: a) initiating a first inter-MSC handback attempt from the second MSC to the first MSC in response to the MS moving into a geographic area associated with the first MSC, b) setting up resources in the first MSC and a first BS associated with the first MSC for routing the call to the MS, c) sending a command to the MS directing the MS to begin the first inter-MSC handback attempt by attempting to communicate with the first BS, d) receiving a message from the MS indicating that the first inter-MSC handback attempt to the first BS failed, e) sending a message from the second MSC to the first MSC instructing the first MSC to clean up the resources set up in the first MSC and first BS for routing the call to the MS, f) cleaning up the resources set up in the first MSC for routing the call to the MS and sending a message from the first MSC to the first BS instructing the first BS to clean up the resources set up in the first BS for routing the call to the MS, g) cleaning up the resources set up in the first BS for routing the call to the MS and sending a message from the first BS to the first MSC informing the first MSC that the resources set up in the first BS for routing the call to the MS are cleaned up, h) sending a message from the first MSC to the second MSC informing the second MSC that the resources set up in the first MSC and first BS for routing the call to the MS are cleaned up, i) sending a message from the second MSC to a second BS associated with the second MSC indicating that the first MSC and first BS are ready for another inter-MSC handback attempt, j) initiating a second inter-MSC handback attempt by repeating steps a) through c), k) receiving a message from the MS indicating that the second inter-MSC handback attempt to the first BS was completed, l) clearing the resources used in the second MSC and second BS for routing the call to the MS, and m) tearing down the inter-MSC trunk used for routing the call from the first MSC to the second MSC.

In another aspect of the invention, a wireless telecommunication system providing a handback process after an inter-MSC handoff from a first MSC to a second MSC during an active call to an MS is provided. The call is routed from the first MSC to the second MSC via an inter-MSC trunk as a result of the inter-MSC handoff. In one embodiment, the system includes: means for initiating an inter-MSC handback attempt from the second MSC to the first MSC in response to the MS moving into a geographic area associated with the first MSC, means for setting up resources in the first MSC and a first BS associated with the first MSC for routing the call to the MS, means for sending a command to the MS directing the MS to begin the inter-MSC handback attempt by attempting to communicate with the first BS, means for receiving a message from the MS indicating that the inter-MSC handback attempt to the first BS failed, means for cleaning up the resources set up in the first MSC and first BS for routing the call to the MS, and means for sending a message to a second BS associated with the second MSC indicating that the first MSC and first BS are ready for another inter-MSC handback attempt.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 3 and 4 combine to provide a call flow diagram of a method for providing a repeatable handback attempt after an inter-MSC handoff.

DETAILED DESCRIPTION OF THE PREFERRED EMBODIMENTS

Figure 1:
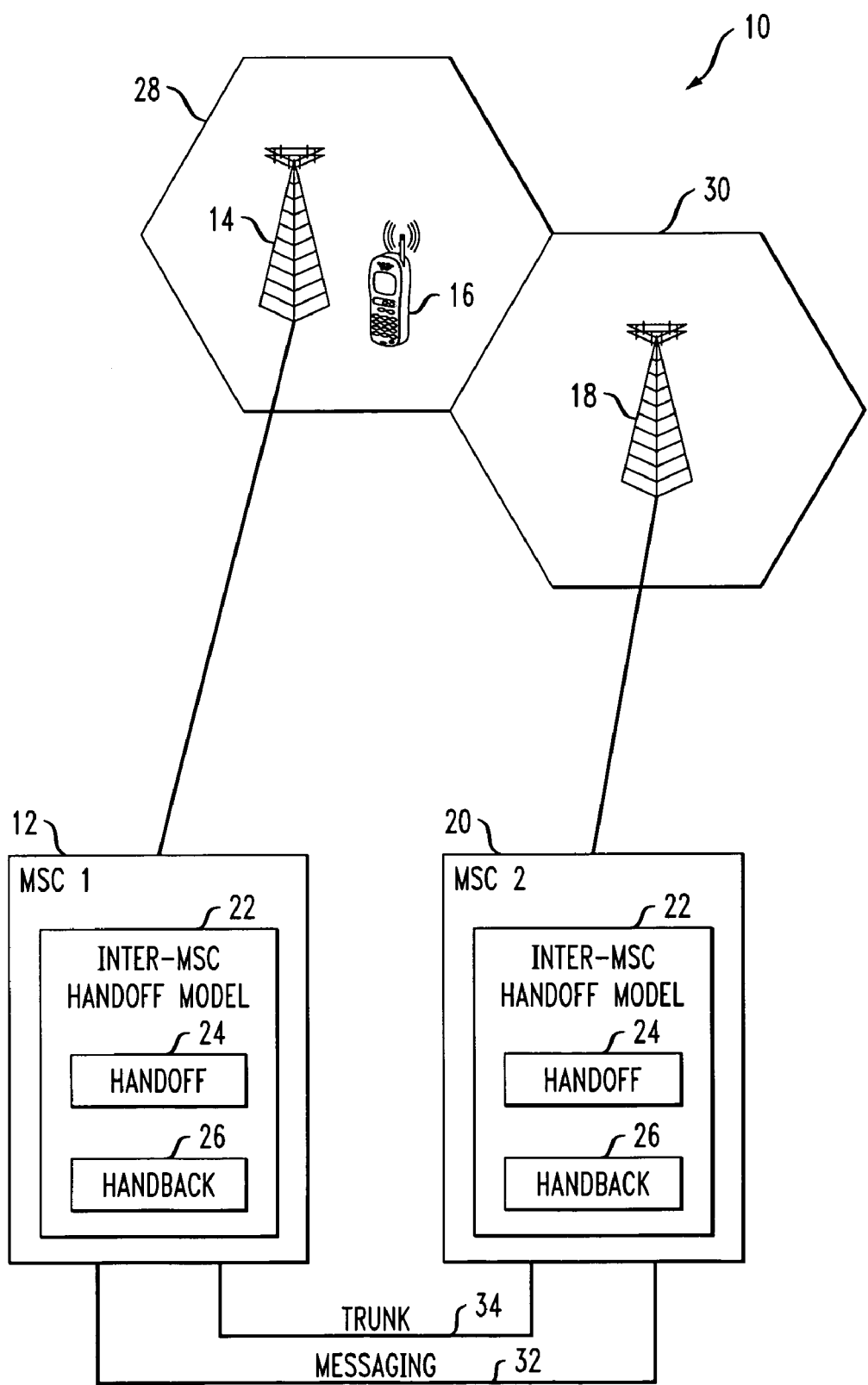
FIG. 1 is a block diagram of an embodiment of a telecommunication system incorporating a repeatable handback attempt after an inter-MSC handoff.

In general, one aspect of the present invention enhances the chance of a successful handback after a failed handback attempt. This could lead to expanding the ANSI-41 standards to accommodate messaging associated with repeating a handback attempt. The handback attempt is able to be repeated by using a message type and message exchanges to convey the need to partially clean up resources on the handback target side while preserving an allocated inter-MSC or inter-vendor trunk between the two MSCs involved in the handback. This enables the source MSC and source BS (i.e., cell) to know when resources are cleaned up and when another handback attempt may be started.

Inter-vendor handoffs use ANSI-4 1 messages associated with hard handoffs between two MSCs associated with different vendors. Sometimes, MSCs of the same vendor use ANSI-41 messages for inter-MSC handoffs. The messaging associated with the present invention includes messages and exchanges between the source MSC (MSC B) and the target MSC (MSC A) that result in: 1) keeping the inter-MSC trunk between the two MSCs up for the call (this is a trunk that is established during a previous handoff from, for example, MSC A to MSC B), while the target MSC cleans up resources that were allocated for a previous failed or aborted handback attempt and 2) sending a return result message to the source MSC after it is finished with resource clean up, thus indicating when the source MSC can start the next handback attempt.

For example, currently, no ANSI-41 message can prompt a cleanup of the allocated Lucent Technologies 5E frame selector on the target side during a failed ANSI-41 handback attempt. Hence, when the MS sends a candidate frequency search report message to the source cell (i.e., BS B), after which the source cell sends a message to abort the handback attempt to the source MSC indicating that the current handback attempt failed and that the wireless call is being saved, the source MSC has no way of asking the target MSC to free up the 5E frame selector allocated on the target MSC for the current handback attempt. Therefore, currently, the resources allocated for the handback get dropped on the target MSC only after a shutdown message from the target cell (i.e., BS A) to the target MSC after a timeout on that cell (e.g., after 4.8 seconds) due to the MS "not showing up." With the present invention, a message from the source MSC to the target MSC is provided so that the target MSC does not have to wait for the target cell to time out. The target MSC is notified to clean up its resources and to send a message to the target cell to do the same. Once the resources in the target MSC and target cell are cleaned up, the target MSC sends a return result message to the source MSC indicating that it is ready for another handback attempt. The source MSC can pass this information to the source cell.

Currently, without the additional messaging the source MSC does not know whether it should immediately process a handback request or wait for resources to be cleared on the target side. Moreover, the additional messaging allows the inter-vendor or inter-MSC trunk between the two MSCs to be maintained until success of a handback attempt is confirmed with the MS on channel with the target side. Otherwise, since we need to keep the call on MSC B to which the call was originally handed off from MSC A, if the inter-vendor or inter-MSC trunk is released, the call is dropped. The additional messaging allows the system to save resources by providing a reasonable communication protocol enabling another handback attempt just after all the resources from the failed attempt are cleaned up. This also results in higher handoff success rates and lower call drop rates which is pleasing to the mobile user and service providers associated with the call.

Referring now to the drawings wherein the showings are for purposes of illustrating the preferred embodiments of the invention only and not for purposes of limiting same, FIG. 1 provides a view of the overall preferred telecommunication system according to the present invention. As shown in FIG. 1, a telecommunication system 10 includes a first MSC (MSC 1) 12, a first BS (BS 1) 14, an MS 16, a second BS (BS 2) 18, and a second MSC (MSC 2) 20. The first and second MSCs 12, 20 include an inter-MSC handoff model 22. The inter-MSC handoff model 22 includes a handoff portion 24 and a handback portion 26. The first BS 14 is located within a first cell (cell 1) 28 and associated with a first geographical area represented by the hexagon in the diagram. Similarly, the second BS 18 is located within a second cell (cell 2) 30. The first BS 14 is in communication with the first MSC 12 and the second BS is in communication with the second MSC 20. The MS 16 is shown within the geographic area serviced by the first BS 14. The MS 16 is in wireless communication with one or more of the BS, depending on its geographic location. The first and second MSCs 12, 20 communicate using a messaging channel 32. The telecommunication system 10 also includes an inter-MSC trunk 34 between the first and second MSCs 12, 20.

For example, a call to the MS 16 is handled by the first MSC 12 when the MS 16 is located within the first cell 28. If the MS 16 moves to the second cell 30, the first BS 14 communicates a handoff request to the first MSC 12. The handoff portion 24 of the inter-MSC handoff model 22 in the first MSC 12 services the handoff request and the first MSC 12 communicates a resource request for a handoff to the second MSC 20. The first MSC 12 and first BS 14 are the source side and the second MSC 20 and second BS 18 are the target side for the handoff. The handoff portion 24 of the inter-MSC handoff model 22 in the second MSC 20 services the resource request, sets up resources to handle the call, and relays the resource request to the second BS 18. After setting up the resources for the handoff, the second BS 18 and second MSC 20, respectively, provide a return message confirming that the resources are set up.

At this point, the inter-MSC trunk 34 and other resources to handle the call are set up through the target side. The first MSC 12 communicates a handoff command to the first BS 14 which relays the handoff command to the MS 16. After receiving the handoff command, the MS 16 attempts to communicate with the second BS 18. After the MS 16 successfully communicates with the second BS 18, the second BS 18 communicates a handoff complete message to the second MSC 20. At this point, the handoff was successful and the second MSC 20 communicates a message to the first MSC 12 to release resources through the first BS 14 that were allocated for the call to the MS 16. The first MSC 12 communicates a message to the first BS 14 to clear the allocated resources. At this point, the handoff is complete.

If the MS 16 moves back to the first cell 28, the second BS 18 communicates a handback request to the second MSC 20. The handback portion 26 of the inter-MSC handoff model 22 in the second MSC 20 services the handback request and the second MSC 20 communicates a resource request for a handback to the first MSC 12. The second MSC 20 and second BS 18 are the source side and the first MSC 12 and first BS 14 are the target side for the handback. The handback portion 26 of the inter-MSC handoff model 22 in the first MSC 12 services the resource request, sets up resources to handle the call, and relays the resource request to the first BS 14. After setting up the resources for the handback, the first BS 14 and first MSC 12, respectively, provide a return message confirming that the resources are set up.

At this point, the resources to handle the call are set up through the target side and the inter-MSC trunk 34 is maintained. The second MSC 20 communicates a handback command to the second BS 18 which relays the handback command to the MS 16. After receiving the handback command, the MS 16 attempts to communicate with the first BS 14. After the MS 16 successfully communicates with the first BS 14, the first BS 14 communicates a handback complete message to the first MSC 12. At this point, the handoff was successful and the first MSC 12 communicates a message to the second MSC 20 to release resources through the second BS 18 that were allocated for the call to the MS 16. The second MSC 20 communicates a message to the second BS 18 to clear the allocated resources. The second BS 18 and second MSC 20, respectively, provide a return message confirming that the allocated resources are cleared. At this point, the handback is complete and the inter-MSC trunk 34 is torn down.

If, for any reason, the MS 16 cannot communicate with the first BS 14 after receiving the handback command, the MS communicates a candidate frequency search report (CFSR) message to the second BS 18. The second BS 18 relays the CFSR message to the second MSC 20. The handback portion 26 of the inter-MSC handoff model 22 in the second MSC 20 handles the CFSR message as an abort for the current handback attempt and the second MSC 20 communicates a message to the first MSC 12 to clean resources through the first BS 14 that were allocated for the handback. The handback portion 26 of the inter-MSC handoff model 22 in the first MSC 12 services the clean resources request, cleans up resources that were allocated for the handback, and relays the clean resources request to the first BS 14. After cleaning up the resources allocated for the handback, the first BS 14 and first MSC 12, respectively, provide a return message confirming that the resources are cleaned up. At this point, the system is ready for the next handback attempt and the second MSC 20 communicates a ready for next handback attempt message to the second BS 18. If the MS 16 is still located in the first cell 28, the second BS 18 communicates a second handback request to the second MSC 20 and the handback process described above is repeated. The handback process may be repeated multiple times in the same manner as long as the call is still active and the MS 16 is within communication range of the second BS 18.

The various operations described above for the telecommunication system 10, including one or more of the first MSC 12, first BS 14, MS 16, second BS 18, second MSC 20, inter-MSC handoff model 22, handoff portion 24, and handback portion 26 may be implemented by hardware, software, and/or combinations thereof.

The exemplary handback operations described above in reference to FIG. 1 provide a scenario where the handback is to the same BS from which the preceding handoff originated. It is well known that an MSC typically controls a plurality of BSs situated in a plurality of cells defining a particular geographic area for which that MSC is responsible. Thus, BS 2 represents any base station to which the call is eventually handed off within MSC 2, before handback is attempted to BS 1 which again represents any base station within MSC 1. Therefore, the handback operation described above equally applies to any handback scenario in which there is an inter-MSC handback from MSC 2 to MSC 1. This applies to each handback attempt individually. For example, a first handback attempt may be to BS X controlled by MSC 1 and a repeated handback attempt may be to BS Y controlled by MSC 1.

Figure 2:
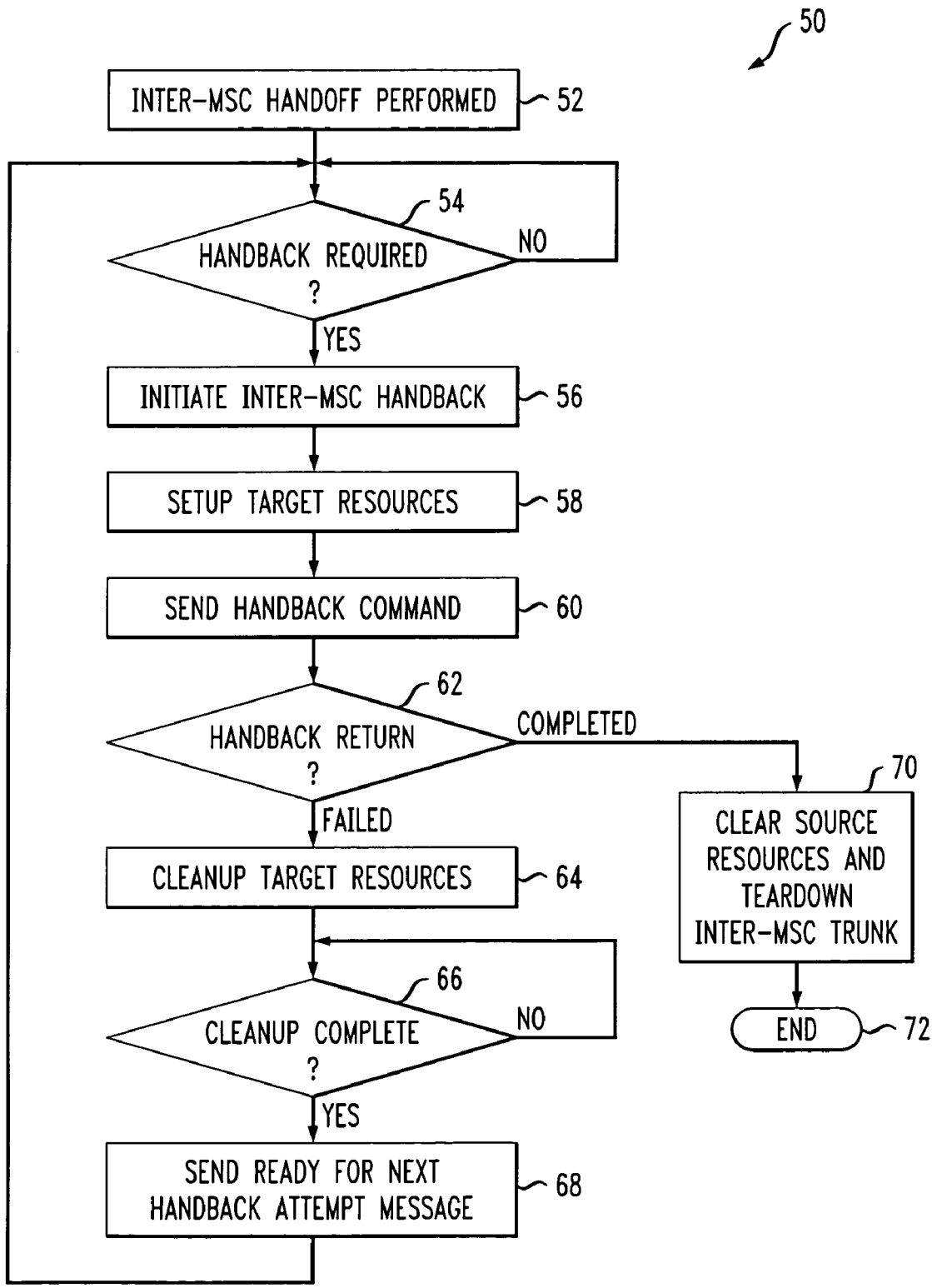
FIG. 2 is a flowchart of an embodiment of a method for providing a repeatable handback attempt after an inter-MSC handoff.

With reference to FIG. 2, a method 50 for providing a repeatable handback process after an inter-MSC handoff begins at step 52 where the inter-MSC handoff was performed. For example, a call to an MS was handled by MSC 1 because the MS was located within a geographic area covered by BS 1 and serviced by MSC 1. Subsequently, the MS moved to a geographic area covered by BS 2 and serviced by MSC 2 which required the inter-MSC handoff and "routed" the call through an inter-MSC trunk between MSC 1 and MSC 2. Next, the process determines when a handback to BS 1 is required (step 54). If the MS moves back to the geographic area covered by BS 1, a handback is required and the process advances to step 56, otherwise the process remains at step 54. At step 56, the process initiates an inter-MSC handback from BS 2 to BS 1. BS 2 and MSC 2 are the source side and BS 1 and MSC 1 are the target side for the handback attempt. Next, resources for handling the handback attempt are set up in the target side (step 58). At step 60, the process sends a handback command to the MS. Next, the process determines whether a return message from the MS in response to the handback command indicates that the handback attempt failed or was completed (step 62).

If the handback attempt failed, at step 64, the process initiates clean up of the resources on the target side allocated for the handback attempt. Next, the process determines when cleanup of the allocated resources on the target side is complete (step 66). When the resource cleanup is complete, at step 68, the process sends a ready for next handback attempt message through the source side. If the call is still active and the MS within communicative range of BS 2, the process returns to step 54. If the MS is still located in the geographic area covered by BS 1, the handback process is repeated. It should be noted that while the target resources are being cleaned up after a failed handback attempt, the MS may move into a geographic area that may call for a soft handoff by MSC 2 to another BS within its coverage area. The handback process described herein does not limit MSC 2 from directly performing these types of handoffs as they are required. If MSC 2 initiates another type of handoff during the handback process, MSC 2 may end and clean up the handback process in any suitable orderly manner.

At step 62, if the handback is completed (i.e., the MS is able to communicate with BS 1), the process clears the source resources used for the call and tears down the inter-MSC trunk (step 70). At step 72, the handback process is at its end.

The various steps in the foregoing method 50 may be implemented by hardware, software, and/or combinations thereof within the telecommunication system 10 (FIG. 1), including one or more of the first MSC 12 (FIG. 1), first BS 14 (FIG. 1), MS 16 (FIG. 1), second BS 18 (FIG. 1), second MSC 20 (FIG. 1), inter-MSC handoff model 22 (FIG. 1), handoff portion 24 (FIG. 1), and handback portion 26 (FIG. 1). More specifically, steps 52, 56, 58, 62, 64, 66, and 70 may be implemented at least in part by hardware, software, and/or combinations thereof within the first MSC 12 (FIG. 1). More specifically, steps 52, 58, 62, 64, and 66 may be implemented at least in part by hardware, software, and/or combinations thereof within the first BS 14 (FIG. 1). More specifically, steps 52, 54, 60, 62, and 68 may be implemented at least in part by hardware, software, and/or combinations thereof within the MS 16 (FIG. 1). More specifically, steps 52, 54, 60, 62, 68, and 70 may be implemented at least in part by hardware, software, and/or combinations thereof within the second BS 18 (FIG. 1). More specifically, steps 52, 54, 56, 60, 62, 64, 68, and 70 may be implemented at least in part by hardware, software, and/or combinations thereof within the second MSC 20 (FIG. 1). More specifically, steps 52, 54, 56, 58, 60, 62, 64, 66, 68, and 70 may be implemented at least in part by hardware, software, and/or combinations thereof within the inter-MSC handoff model 22 (FIG. 1). More specifically, step 52 may be implemented at least in part by hardware, software, and/or combinations thereof within the handoff portion 24 (FIG. 1). More specifically, steps 54, 56, 58, 60, 62, 64, 66, 68, and 70 may be implemented at least in part by hardware, software, and/or combinations thereof within the handback portion 26 (FIG. 1).

Like for FIG. 1, the exemplary handback operations described above in reference to FIG. 2 provide a scenario where the handback is to the same BS from which the preceding handoff originated. Again, it is understood that the handback operation described above may alternatively be to any BS associated with a neighboring cell with respect to BS 2 that is controlled by MSC 1. Therefore, the handback operation described above equally applies to any handback scenario in which there is an inter-MSC handback from MSC 2 to MSC 1. This applies to each handback attempt individually.

Figure 3:
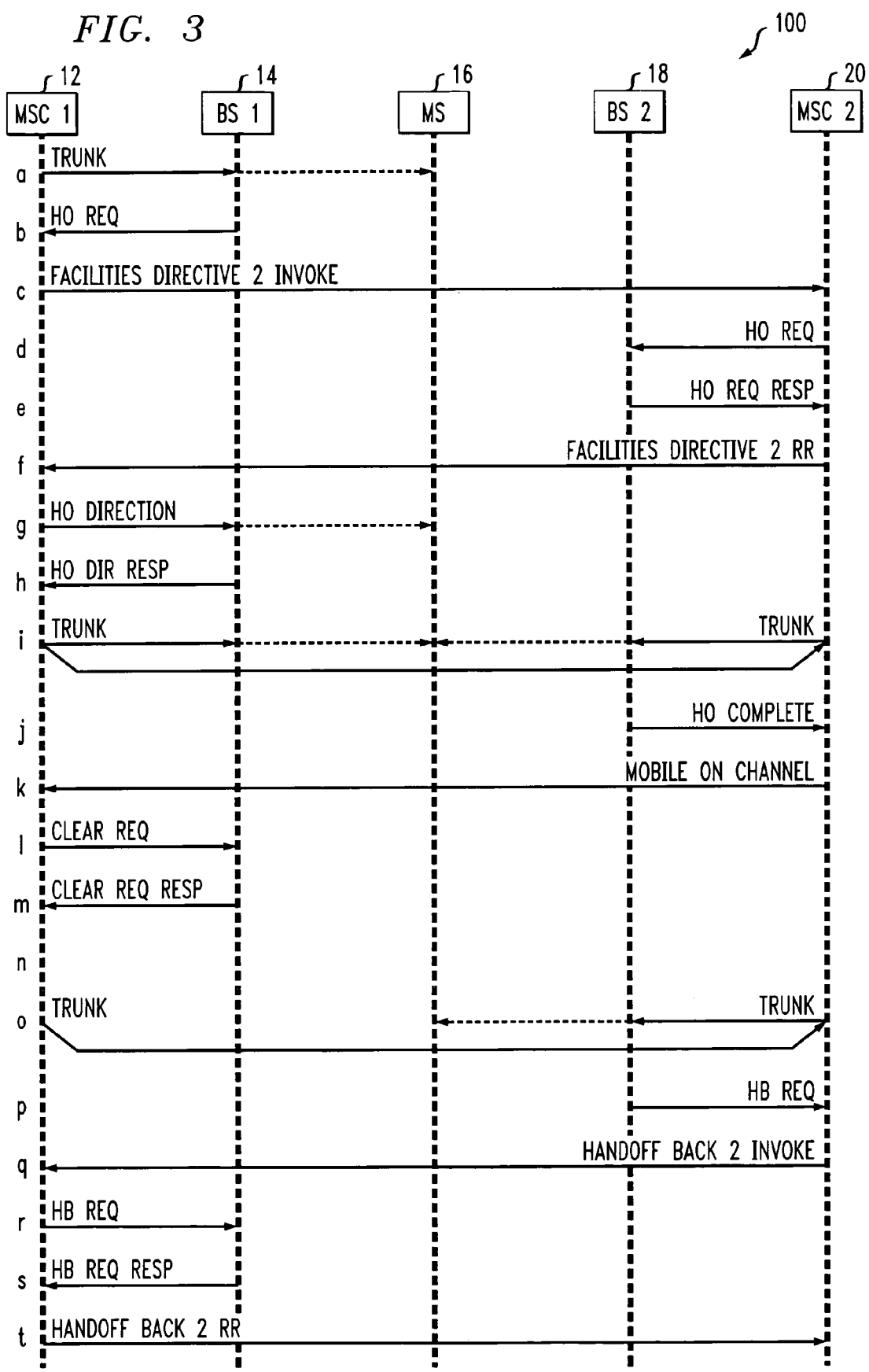

With reference to FIGS. 3 and 4, an exemplary call flow diagram provides another view of a method for providing a repeatable handback attempt after an inter-MSC handoff. The call flow depicts an exemplary scenario where a successful handoff attempt (lines a-o) is followed by a failed handback attempt (lines p-aa). In the scenario, the handback attempt is repeated and succeeds on the second attempt (lines ab-ao).

The call flow begins at line a, where a call to the MS 16 is routed through MSC 1 12 and BS 1 14 via a trunk. At line b, with the MS moved into the geographic area covered by BS 2 18, BS 1 sends a handoff request message to MSC 1. In response, MSC 1 sends a facilities directive 2 invoke message to MSC 2 20 (line c). At line d, MSC 2 allocates resources for the handoff and sends a handoff requirement message to BS 2. In response, BS 2 allocates resources for the handoff and sends a handoff requirement response to MSC 2 indicating that BS 2 resources are allocated (line e). At line f, MSC 2 sends a facilities directive 2 return result to MSC 1 indicating that BS 2 and MSC 2 resources are allocated. In response, MSC 1 sends a handoff direction command to BS 1 which is relayed to the MS (line g). At line h, the MS attempts to communicate with BS 2 and, after a timeout, successful communication with BS 2 is presumed and BS 1 sends a handoff direction response to MSC 1. At this point, the call is routed to the MS through MSC 2 and BS 2 as well as through MSC 1 and BS 1 with an inter-MSC trunk routing the call between MSC 1 and MSC 2 (line i).

At line j, based on successful communication with the MS, BS 2 sends a handoff complete message to MSC 2. In response, MSC 2 sends a mobile on channel message to MSC 1 (line k). At line 1, MSC 1 clears the resources previously allocated to the call and sends a clear request to BS 1 to clear BS 1 resources allocated for the call. In response, BS 1 clears the allocated resources and sends a clear request response to MSC 1 indicating that the allocated BS 1 resources are cleared (line m). At this point, the call is routed to the MS through MSC 2 and BS 2 with an inter-MSC trunk routing the call between MSC 1 and MSC 2 (line o).

At line p, with the MS moved into the geographic area covered by BS 1, BS 2 sends a handback request to MSC 2. In response, MSC 2 sends a handoff back 2 invoke message to MSC 1 (line q). At line r, MSC 1 allocates resources for the handback and sends a handback requirement message to BS 1. In response, BS 1 allocates resources for the handback and sends a handback requirement response to MSC 1 indicating that BS 1 resources are allocated (line s). At line t, MSC 1 sends a handoff back 2 return result to MSC 2 indicating that BS 1 and MSC 1 resources are allocated. In response, MSC 2 sends a handback direction command to BS 2 which is relayed to the MS (line u). At line v, the MS attempts to communication with BS 1 and, unable to communicate with BS 1, sends a candidate frequency search report (CFSR) message to BS 2 which is relayed to MSC 2. In response, MSC 2 aborts the current handback and sends a clean local invoke message to MSC 1 to clean up the resources allocated for the handback (line w). At line x, MSC 1 cleans up the allocated resources and sends a clean local request message to BS 1 to clean up the BS 1 resources allocated for the handback. In response, BS 1 cleans up the allocated resources and sends a clean local request response to MSC 1 indicating that the BS 1 resource are cleaned up (line y). At line z, MSC 1 sends a clean local return result to MSC 2 indicating that the BS 1 and MSC 1 resources are cleaned up. In response, MSC 2 sends a ready for next handback attempt message to BS 2.

At line ab, with the MS still in the geographic area covered by BS 1, BS 2 sends another handback request to MSC 2. In response, MSC 2 sends a handoff back 2 invoke message to MSC 1 (line ac). At line ad, MSC 1 allocates resources for the handback and sends a handback requirement message to BS 1. In response, BS 1 allocates resources for the handback and sends a handback requirement response to MSC 1 indicating that BS 1 resources are allocated (line ae). At line af, MSC 1 sends a handoff back 2 return result to MSC 2 indicating that BS 1 and MSC 1 resources are allocated. In response, MSC 2 sends a handback direction command to BS 2 which is relayed to the MS (line ag). At line ah, the MS attempts to communication with BS 1 and, after a timeout, successful communication with BS 1 is presumed and BS 2 sends a handback direction response to MSC 2. At this point, the call is routed to the MS through MSC 1 and BS 1 as well as through MSC 2 and BS 2 with the inter-MSC trunk remaining intact (line ai).

At line aj, based on successful communication with the MS, BS1 sends a handback complete message to MSC 1. In response, MSC 1 sends a facilities release invoke message to MSC 2 (line ak). At line al, MSC 2 clears the resources previously allocated to the call and sends a clear request to BS 2 to clear BS 2 resources allocated for the call. In response, BS 2 clears the allocated resources and sends a clear request response to MSC 2 indicating that the allocated BS 2 resources are cleared (line am). At line an, MSC 2 sends a facilities release return result indicating that MSC 2 and BS 2 resources allocated to the call are cleared. At this point, the call is routed to the MS through MSC 1 and BS 1 and the inter-MSC trunk is torn down.

Like for FIG. 1, the exemplary handback operations described above in reference to FIGS. 3 and 4 provide a scenario where the handback is to the same BS from which the preceding handoff originated. Again, it is understood that the handback operation described above may alternatively be to any BS controlled by MSC 1 and associated with a neighboring cell with respect to BS 2. Therefore, the handback operation described above equally applies to any handback scenario in which there is an inter-MSC handback from MSC 2 to MSC 1. This applies to each handback attempt individually.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for providing a handback process in a wireless telecommunication system after an inter-MSC handoff from a first MSC to a second MSC during an active call to an MS, wherein the call is routed from the first MSC to the second MSC via an inter-MSC trunk as a result of the inter-MSC handoff, the method including the steps:
   a) initiating an inter-MSC handback attempt from the second MSC to the first MSC in response to the MS moving into a geographic area associated with the first MSC;
   b) setting up resources in the first MSC and a first BS associated with the first MSC for routing the call to the MS;
   c) sending a command to the MS directing the MS to begin the inter-MSC handback attempt by attempting to communicate with the first BS;
   d) receiving a message from the MS indicating that the inter-MSC handback attempt to the first BS failed;
   e) cleaning up the resources set up in the first MSC and first BS for routing the call to the MS; and
   f) sending a message to a second BS associated with the second MSC indicating that the first MSC and first BS are ready for another inter-MSC handback attempt.

2. The method as set forth in claim 1, further including:
   g) initiating a next inter-MSC handback attempt by repeating steps a) through c);
   h) receiving a message from the first BS indicating that the next inter-MSC handback attempt to the first BS was completed;
   i) clearing the resources used in the second MSC and second BS for routing the call to the MS; and
   j) tearing down the inter-MSC trunk used for routing the call from the first MSC to the second MSC.

3. The method as set forth in claim 1, step e) further including the step:
   g) sending a message from the second MSC to the first MSC instructing the first MSC to clean up the resources set up in the first MSC and first BS for routing the call to the MS.

4. The method as set forth in claim 3, step e) further including the step:
   h) sending a message from the first MSC to the second MSC informing the second MSC that the resources set up in the first MSC and first BS for routing the call to the MS are cleaned up.

5. The method as set forth in claim 4 wherein the message in step f) is sent to the second BS by the second MSC in response to the message received by the second MSC in step h).

6. The method as set forth in claim 3, step e) further including the step:
   h) sending a message from the first MSC to the first BS instructing the first BS to clean up the resources set up in the first BS for routing the call to the MS.

7. The method as set forth in claim 5, step e) further including the step:
   i) sending a message from the first BS to the first MSC informing the first MSC that the resources set up in the first BS for routing the call to the MS are cleaned up.

8. The method as set forth in claim 1 wherein the message in step f) is sent to the second BS from the second MSC.

9. A method for providing a handback process in a wireless telecommunication system after an inter-MSC handoff from a first MSC to a a second MSC during an active call to an MS, wherein the call is routed from the first MSC to the second MSC via an inter-MSC trunk as a result of the inter-MSC handoff, the method including the steps:
   a) initiating a first inter-MSC handback attempt from the second MSC to the first MSC in response to the MS moving into a geographic area associated with the first MSC;
   b) setting up resources in the first MSC and a first BS associated with the first MSC for routing the call to the MS;
   c) sending a command to the MS directing the MS to begin the first inter-MSC handback attempt by attempting to communicate with the first BS;
   d) receiving a message from the MS indicating that the first inter-MSC handback attempt to the first BS failed;
   e) sending a message from the second MSC to the first MSC instructing the first MSC to clean up the resources set up in the first MSC and first BS for routing the call to the MS;
   f) cleaning up the resources set up in the first MSC for routing the call to the MS and sending a message from the first MSC to the first BS instructing the first BS to clean up the resources set up in the first BS for routing the call to the MS;
   g) cleaning up the resources set up in the first BS for routing the call to the MS and sending a message from the first BS to the first MSC informing the first MSC that the resources set up in the first BS for routing the call to the MS are cleaned up;
   h) sending a message from the first MSC to the second MSC informing the second MSC that the resources set up in the first MSC and first BS for routing the call to the MS are cleaned up;
   i) sending a message from the second MSC to a second BS associated with the second MSC indicating that the first MSC and first BS are ready for another inter-MSC handback attempt;
   j) initiating a second inter-MSC handback attempt by repeating steps a) through c);
   k) receiving a message from the first BS indicating that the second inter-MSC handback attempt to the first BS was completed;
   l) clearing the resources used in the second MSC and second BS for routing the call to the MS; and
   m) tearing down the inter-MSC trunk used for routing the call from the first MSC to the second MSC.

10. The method as set forth in claim 9, step a) further including the steps:
   n) sending a message from the second BS to the second MSC requesting a handback attempt to the first BS; and
   o) sending a message from the second MSC to the first MSC instructing the first MSC to set up resources in the first MSC and first BS for routing the call to the MS.

11. The method as set forth in claim 10, step b) further including the steps:
   p) sending a-message from the first MSC to the first BS instructing the first BS to set up resources in the first BS for routing the call to the MS;
   q) sending a message from the first BS to the first MSC informing the first MSC that resources are set up in the first BS for routing the call to the MS; and
   r) sending a message from the first MSC to the second MSC informing the second MSC that resources are set up in the first MSC and first BS for routing the call to the MS.

12. The method as set forth in claim 9, step c) further including the steps:
   n) sending a command from the second MSC to the second BS directing the MS to begin the first handback attempt and instructing the second BS to relay the command to the MS; and
   o) sending a command from the second BS to the MS directing the MS to begin the first handback attempt by attempting to communicate with the first BS.

13. The method as set forth in claim 9, step d) further including the step:
   n) receiving a message at the second BS from the MS indicating that the first handback attempt to the first BS failed; and
   o) sending a message from the second BS to the second MSC indicating that the first handback attempt to the first BS failed.

14. The method as set forth in claim 9, step k) further including the step:
   n) sending a message from the second BS to the second MSC indicating that the second handback attempt to the first BS was successful; and
   o) sending a message from the first BS to the first MSC indicating that the second handback attempt was completed.

15. The method as set forth in claim 14, step l) further including the step:
   p) sending a message from the first MSC to the second MSC instructing the second MSC to release the resources used in the second MSC and second BS for routing the call to the MS; and
   q) sending a message from the second MSC to the second BS instructing the second BS to release the resources used in the second BS for routing the call to the MS.

16. A wireless telecommunication system providing a handback process after an inter-MSC handoff from a first MSC to a second MSC during an active call to an MS, wherein the call is routed from the first MSC to the second MSC via an inter-MSC trunk as a result of the inter-MSC handoff, the system including:
   means for initiating an inter-MSC handback attempt from the second MSC to the first MSC in response to the MS moving into a geographic area associated with the first MSC;
   means for setting up resources in the first MSC and a first BS associated with the first MSC for routing the call to the MS;
   means for sending a command to the MS directing the MS to begin the inter-MSC handback attempt by attempting to communicate with the first BS;
   means for receiving a message from the MS indicating that the inter-MSC handback attempt to the first BS failed;
   means for cleaning up the resources set up in the first MSC and first BS for routing the call to the MS; and means for sending a message to a second BS associated with the second MSC indicating that the first MSC and first BS are ready for another inter-MSC handback attempt.

17. The system as set forth in claim 16, further including:
means for initiating a next inter-MSC handback attempt from the second BS to the first BS while the MS remains in the geographic area associated with the first MSC;
means for receiving a message from the first BS indicating that the next inter-MSC handback attempt to the first BS was completed;
means for clearing the resources used in the second MSC and second BS for routing the call to the MS; and
means for tearing down the inter-MSC trunk used for routing the call from the first MSC to the second MSC.

18. The system as set forth in claim 16, further including:
means for sending a message from the second MSC to the first MSC instructing the first MSC to clean up the resources set up in the first MSC and first BS for routing the call to the MS.

19. The system as set forth in claim 18, further including:
means for sending a message from the first MSC to the second MSC informing the second MSC that the resources set up in the first MSC and first BS for routing the call to the MS are cleaned up.

20. The system as set forth in claim 18, further including:
means for sending a message from the first MSC to the first BS instructing the first BS to clean up the resources set up in the first BS for routing the call to the MS.

* * * * *